(12) United States Patent
Furst

(10) Patent No.: US 7,822,345 B2
(45) Date of Patent: Oct. 26, 2010

(54) OUTPUT STAGE FOR CARRYING OUT WDM MESSAGE TRANSMISSION AND METHODS FOR EXCHANGING FULL LIGHT SOURCES IN AN OUTPUT STAGE OF THIS TYPE

(75) Inventor: Cornelius Furst, Auenwald (DE)

(73) Assignee: Ericsson AB, Stockholm (SE)

( * ) Notice: Subject to any disclaimer, the term of this patent is extended or adjusted under 35 U.S.C. 154(b) by 939 days.

(21) Appl. No.: 10/543,730

(22) PCT Filed: Jan. 21, 2004

(86) PCT No.: PCT/IB2004/000599

§ 371 (c)(1),
(2), (4) Date: Jul. 25, 2006

(87) PCT Pub. No.: WO2004/068765

PCT Pub. Date: Aug. 12, 2004

(65) Prior Publication Data

US 2006/0263089 A1 Nov. 23, 2006

(30) Foreign Application Priority Data

Jan. 28, 2003 (DE) ................. 103 03 314

(51) Int. Cl.
*H04J 14/02* (2006.01)

(52) U.S. Cl. ............... 398/94; 398/91; 398/93; 398/79; 398/82; 398/83; 398/34; 398/38

(58) Field of Classification Search ............ 398/22, 398/34, 38, 79, 82, 83, 91–94, 135, 158
See application file for complete search history.

(56) References Cited

U.S. PATENT DOCUMENTS 5,907,420 A 5/1999 Chraplyvy et al.
6,031,647 A * 2/2000 Roberts ............... 398/94

(Continued)

FOREIGN PATENT DOCUMENTS

EP 0 742 650 A1 11/1996

(Continued)

OTHER PUBLICATIONS

Bakhshi et al "Optical test equipment for performance evaluation of installed DWDM system", OFC 2002, pp. 166-168.*

*Primary Examiner*—Li Liu
(74) *Attorney, Agent, or Firm*—Kirschstein, et al.

(57) ABSTRACT

An output stage for WDM information transmission transmits a plurality of carrier waves modulated by an information signal and a filling lightwave. A first control circuit controls a desired power signal which determines the power of the filling light source so that the total power of carrier and filling lightwaves detected by a photodetector is held constant at a predetermined reference level. The filling light source is part of an assembly which is replaceably mounted at a first mounting location of the output stage. At a second mounting location of the output stage a second assembly comprising a second filling light source is mounted or adapted to be mounted. An auxiliary circuit is adapted to provide one of the two filling light sources with a continuously decreasing second desired power signal.

13 Claims, 2 Drawing Sheets

U.S. PATENT DOCUMENTS

Figure 1:
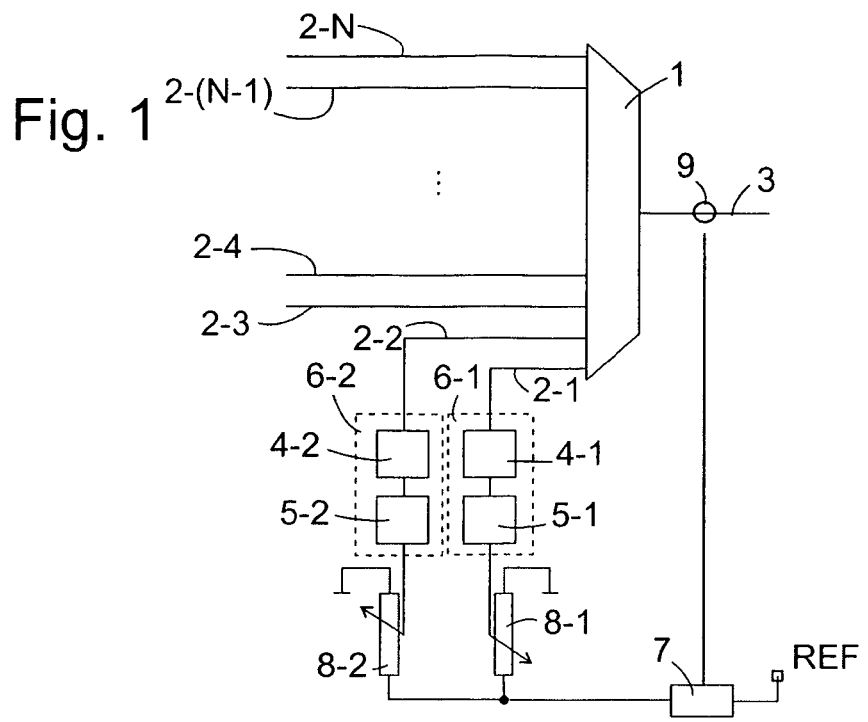

| | | |
|---|---|---|
| 6,275,313 B1 | 8/2001 | Denkin et al. |
| 6,324,318 B1 | 11/2001 | Suzuki |
| 6,426,817 B1 * | 7/2002 | Tomita ......................... 398/82 |
| 6,708,002 B1 * | 3/2004 | Novak et al. ................... 398/79 |
| 6,944,399 B2 * | 9/2005 | Yu et al. ......................... 398/5 |
| 6,999,683 B2 * | 2/2006 | Kerfoot et al. ................. 398/85 |
| 7,013,088 B1 * | 3/2006 | Jiang et al. ................... 398/139 |
| 2001/0046344 A1 | 11/2001 | Hayashi et al. |
| 2002/0105716 A1 | 8/2002 | Tanaka et al. |
| 2003/0108072 A1 * | 6/2003 | Hedin ......................... 372/32 |
| 2003/0137720 A1 * | 7/2003 | Onaka et al. ................. 359/334 |

FOREIGN PATENT DOCUMENTS

| | | |
|---|---|---|
| EP | 1 022 869 A1 | 1/2000 |
| EP | 1213865 * | 6/2002 |
| WO | WO 00/72479 A1 | 11/2000 |

* cited by examiner

OUTPUT STAGE FOR CARRYING OUT WDM MESSAGE TRANSMISSION AND METHODS FOR EXCHANGING FULL LIGHT SOURCES IN AN OUTPUT STAGE OF THIS TYPE

The present invention relates to a node of an optical transmission network for transmission of optical information signals in wavelength division multiplex (WDM, specifically to an output stage for such a node which uses a filling light source for keeping the transmission power of said node constant, and to a method for replacing filling light sources in such an output stage.

Information signals transmitted in an optical fiber are subject to attenuation which makes it necessary to re-amplify the signals at regular intervals in order to ensure that they reach a receiver with sufficient power. In such an amplifier, all carrier frequencies transmitted in the fiber are amplified simultaneously. For this, the gain of the amplifier must be as exactly identical as possible for all carrier frequencies used, so that even when the signal has passed several amplifiers, the ratio of the powers of the various carrier wavelengths is not shifted substantially. As long as the powers of the carrier wavelengths do not vary with time, this problem may be solved by an appropriate choice of the frequency band of the carrier waves and of the type of amplifier. Problems result, however, if the power of the individual carrier wavelengths varies abruptly. If one or more carrier frequencies suddenly vanish in a fiber of a branched optical information network, e.g. due to an automatic protection function or due to a technical failure at another place of the network, this causes the gain of the remaining carrier waves to increase. This increase becomes extreme if the optical fiber comprises several amplifiers which are passed one after the other. Extremely fast, strong intensity jumps of the carrier waves may result, which may cause failures in the evaluation of the information signals conveyed by the concerned carrier waves at the receiver. In the worst case, these disturbances may cause an automatic protection function to be activated and to switch off the concerned carrier waves. In this way, the disturbance propagates into regions of the network originally not concerned by it, and a catastrophic breakdown may result.

In order to handle this problem, it has been proposed e.g. in U.S. Pat. No. 5,907,420 and U.S. Pat. No. 6,275,313 to transmit in an optical fiber, together with a plurality of information carrier channels at different carrier frequencies, a plurality of filling channels, which are generally not used for information transmission but which essentially serve to buffer fluctuations of the total optical power transmitted in the fiber, which may result from switching on and off individual information carrier channels. I. e., if an information carrier channel fails, this is detected, and the optical power of the filling channel is adapted so that the total optical power of information carrier channels and filling channels remains constant. Abrupt changes of the gain of the information carrier channels are thus avoided.

However, problems result if work has to be carried out in the network which requires a temporary shutdown or a replacement of a filling light source. The information carrier channels are not capable of compensating the power loss which may result from switching off the filling light source. If no filling light source is available at an individual node of the network, and if the power control of the output stage thereof is thus deactivated, intensity fluctuations which result from switching off or on information carrier channels in fibers issuing from this node may be amplified to such an extent that they jeopardize the functionality of the entire network. It is therefore very important to have output stages for such a telecommunication network which allow a temporary shutdown of filling light sources without thereby causing even a short-time disruption of total power control.

The object of the invention is to provide an output stage for WDM information transmission and a method for exchanging filling light sources in such an output stage which satisfy these requirements.

The object is achieved on the one hand by an output stage having a plurality of information channel light sources, each for providing one carrier wave modulated with an information signal at an output of the node, a filling light source for providing a filling lightwave at the same output having a power corresponding to a desired power signal supplied to a control input of the filling light source, at least one photo-detector for detecting the total power of all filling lightwaves and carrier lightwaves at the output of the output stage, and a first control circuit for providing a first desired power signal such that the total power detected by the photo-detector is held constant at a predetermined reference value, wherein the filling light source is part of an assembly which is replaceably mounted in the output stage, the output stage has a second mounting location at which a second assembly identical in function to the first assembly can be mounted, and wherein the output stage comprises an auxiliary circuit for providing one of the two filling light sources with a continuously decreasing second desired power signal. If a second filling light source is mounted at the second mounting location in order to replace the first filling light source, the auxiliary circuit allows to gradually reduce the power of the first filling light source while simultaneously continuously adapting the power of the second filling light source, so that no abrupt jumps in the total power of the output stage occur. When the power of the first filling light source has thus been made zero, it can be dismounted, or work can be carried out on it without thereby influencing the transmission quality of the information signals.

According to a first preferred embodiment of the invention, it is provided that the auxiliary circuit receives the desired power signal from the first control circuit and splits it into the continuously decreasing second desired power signal and a third desired power signal, the second and third desired power signals each being representative of a desired power of the two filling light sources, the sum of which corresponds to the power represented by the first desired power signal. In other words, according to this embodiment, the desired power signal provided by the first control circuit indicates the power which the two filling light sources must have in total in order to keep the total power constant, and the auxiliary circuit assigns to each filling light source the light power to be provided by it.

According to a second preferred embodiment of the invention, the auxiliary circuit is a second control circuit, each control circuit has one of the filling light sources assigned to it, which receives the desired power signal generated by the control circuit, and the control circuits have means for continuously reducing a reference value individually assigned to them, at which they attempt to maintain the total power. If one of the two filling light sources in such an output stage is to be taken out of operation, it is sufficient to reduce the predetermined reference value of the control circuit assigned to this filling light source. The consequence thereof is that the control circuit the reference value of which is reduced finds that the total power is too high and begins accordingly to decrease the power of the assigned filling light source. The decrease in power resulting therefrom is detected by the other control circuit, and this latter circuit attempts to compensate the power decrease by increasing the power of the filling light source assigned to it. This process is continued until the power of the filling light source having the reduced reference value is zero, so that it can be dismounted or work can be carried out on it without the function of the output stage being influenced thereby.

In order to avoid instabilities in the concurrent power control by the two control circuits, it is useful if the control circuits can be switched between two different reaction speeds for the power control of their respective filling light sources. Advantageously, the reaction speed of the filling light source, the power of which is to be reduced to zero, will be set to the lower value and that of the filling light source, the power of which is to increased, will be set to the higher value, in order to keep the total power of information channels and filling light channels of the output stage as exactly as possible at the value which is to be maintained under normal operation of the output stage, while decreasing the power of said one filling light source.

It may also be provided that the speed at which the control circuit of the filling light source to be shut down reacts to a change of the total power detected by the photo detector is set to zero, i.e. the control circuit no longer reacts upon a change of the total power. In this case, it is necessary that the means for reducing the reference value are capable of reducing the reference value continuously to zero in order to bring to zero the power of the filling light source to be shut down.

If each control circuit has a filling light source assigned to it, as indicated above, it is preferably combined with this filling light source in a replaceable assembly, so that in case of a failure, both may conveniently be replaced together.

The replaceable assemblies are preferably realized as circuit boards.

The output of the output stage of the invention is preferably formed by a first one of the outputs of a power splitter, a second one of which is connected to the photo-detector. The power fraction coupled out to the photo-detector at the second output should amount to only a few percent of the total power.

For combining the information carrier waves and the filling lightwaves at the output of the output stage, an optical multiplexer having wavelength selective inputs is provided. Among these inputs, a first one may be connected to an output of the first filling light source and the second one to an output of the second filling light source; in this case, the first and second inputs are preferably selective for adjacent frequencies of the wavelength multiplex, so that a shift of the filling light power from one filling light source to the other influences as little as possible the shape of the spectrum of the wavelength multiplex and, accordingly, an eventual Raman tilt of an optical fiber connected to the output.

Another possibility is to supply the two filling light sources operating at a same wavelength to a common input of the optical multiplexer using a beam combiner. Preferably, a 3 dB coupler is used as a beam combiner, i.e. a coupler which has an identical loss at both of its inputs.

For normal operation of the transmitter of the invention, it is sufficient if one of the two mounting locations thereof is equipped with an assembly containing a filling light source, because if this assembly is to be switched off or removed, the second mounting location may before be equipped with a second assembly while the transmitter is in operation. It is advantageous, however, if also under normal operation both mounting locations are equipped with an assembly, because this provides the possibility of shutting down one of the two filling light sources without a previous human intervention, if a failure of its assembly is detected or suspected.

Further features and advantages of the invention become apparent from the subsequent description of embodiments thereof referring to the appended figures.

FIG. 1 to 4 show block diagrams of embodiments of the output stage of the invention.

FIG. 1 shows an output stage of a network node in a WDM telecommunication network. It comprises a wavelength multiplexer 1 having N inputs 2-1 to 2-N and an output, which is coupled to an optical fiber 3 leading to an other network node. The inputs 2-3 to 2-N each receive a carrier wave modulated by an information signal from a switching fabric (not shown of the node. The inputs 2-1 and 2-2 have two filling lasers 4-1, 4-2 connected to them which are installed together with associated driver circuits 5-1, 5-2 on respective circuit boards 6-1, 6-2 which are replaceably mounted in the output stage. The wavelengths of the carrier waves at the inputs of the multiplexer 1 and of the filling lasers are all different from one another and are uniformly spaced in a predetermined frequency band. The wavelengths of the filling lasers 4-1, 4-2 are immediately adjacent to each other.

A photo-detector 9 is coupled to the input port of the optical fiber 3 in order to detect the total power resulting from the contributions of the information carrier waves and the filling lasers. The photo detector 9 provides a measurement signal representative of the detected power to a control circuit 7, which further receives a reference signal REF which defines a desired value of the total power. The control circuit 7 generates from this a desired value signal which is representative of a power of the filling lasers 4-1, 4-2 which is needed for keeping the total power at the predetermined value. I. e., as long as the total power agrees with the predetermined value of the reference signal, the control circuit 7 keeps the desired value signal generated by it constant; if the detected power is below the predetermined value, it increases the desired value signal until agreement is found again, and if the detected power is above the predetermined value, it reduces the desired value signal accordingly. The control circuit 7 may e.g. be formed by a PI controller, known as such.

The desired value signal output of the control circuit 7 has a first fixed port of two parallel potentiometers 8-1, 8-1 connected to it. The second fixed port of the potentiometers is grounded, and the variable port thereof is connected to the control input of driver circuit 5-1 and 5-2, respectively. The variable ports of the potentiometers may be shifted in a coupled way, so that when the potentiometers are shifted, the input voltages at the control inputs of the driver circuits 5-1, 5-2 divided from the desired power signal vary in opposite directions while the sum thereof is kept constant. I.e., in an extreme position of the potentiometers in which e.g. the control input of driver circuit 5-1 receives the entire desired value signal from the control circuit 7 bypassing potentiometer 8-1 resistance, the input of driver circuit 5-2 is grounded. Thus the filling laser 4-1 generates the entire filling light power required for keeping the total power of the output stage constant, while the filling laser 4-2 is switched off. In this state, the circuit board 6-2 might be missing without the function of the output stage being influenced thereby.

If the circuit board 6-1 is to removed, it is sufficient to displace the potentiometers to their respective other extreme positions, whereby the power of the filling laser 4-1 is gradually reduced to zero and is replaced by filling laser 4-2.

The potentiometers 8-1, 8-2 are not on the circuit boards 6-1, 6-2 but on a common main board, on which the circuit boards are mounted, since in this way a mechanical coupling of the potentiometers is more easily achieved.

Of course, the potentiometers might be replaced by any other controllers which allow to divide the desired power signal in variable proportions between the two driver circuits, e.g. by paired transistors which are controlled by voltage ramps which develop in opposite directions.

Figure 2:
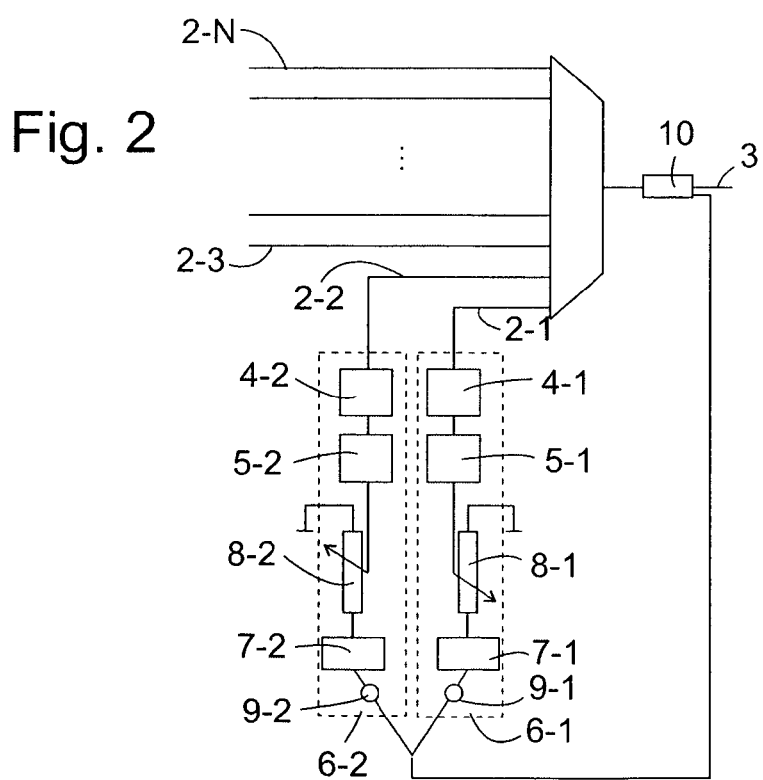

The embodiment of FIG. 2 is distinguished from that of FIG. 1 mainly by the fact that a small fraction of the total power of the output stage, which is extracted from the optical fiber 3 by a coupler 10, is supplied in equal proportions to two photodetectors 9-1 and 9-2, respectively, which are located on the circuit boards 6-1, 6-2 and which have control circuits 7-1 and 7-2, respectively, connected to them which are specifically associated to one filling laser 4-1 and 4-2, respectively, located on the circuit boards. The advantage of this embodiment is in the fact that due to the placement of the control circuits on a same circuit board together with the filling lasers the signal paths between these are shortened and a faster correction of filling laser power is possible in case of fluctuations of the total power. Further, due to the redundancy of the control circuit and the photo detector, failures occurring in these elements may be made up for by switching over from one circuit board to the other.

In this embodiment, a problem may result from the fact that during the gradual transition from one filling laser to the other, both control circuits 7-1, 7-2 concurrently try to keep the total power constant and may excite each other to fluctuate, so that the total power becomes instable. However, this problem can be avoided if for one of the two driver circuits 7-1 or 7-2 a reaction speed with which it reacts to changes of the total power detected by its photo-detector is set longer than for the other. If the reaction times of the two control circuits differ by a factor of 10 or more, it may be assumed that transient fluctuations of the total power are compensated exclusively by the respective faster one of the two control circuits.

Figure 3:
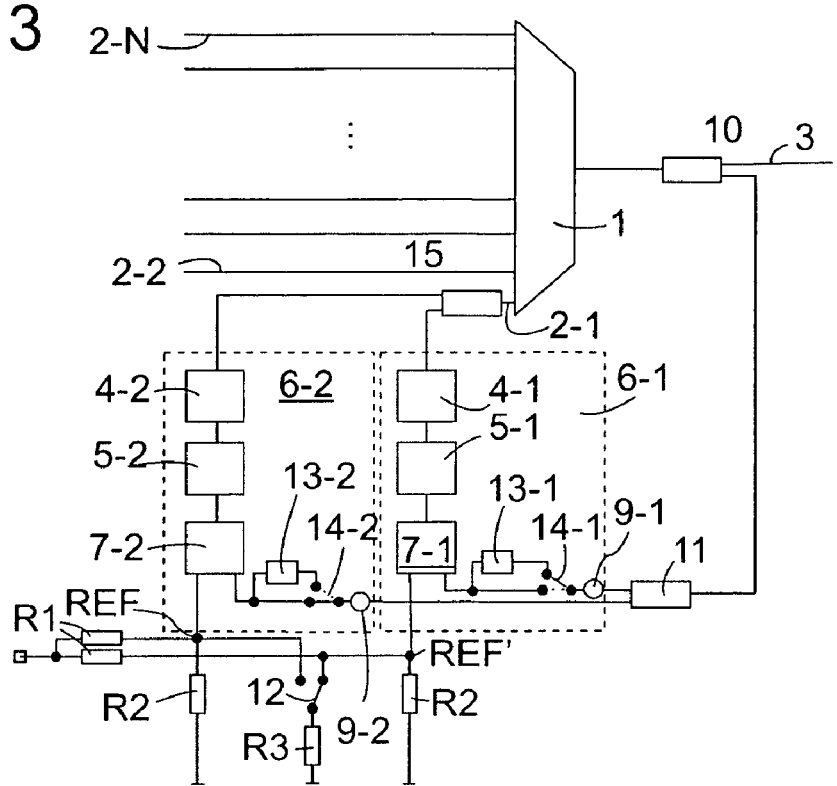

In the embodiment of FIG. 3, like in the one of FIG. 2, on each circuit board 6-1, 6-2, a filling laser 4-1 and 4-2, respectively, a driver circuit 5-1 and 5-2, respectively, therefore, a control circuit 7-1, 7-2 for providing a desired power signal to the respective driver circuit and a photo-detector 9-1, 9-2, respectively, are located, which receive an identical small fraction of the total power via two couplers 10, 11. The control circuit 7-2 further has a reference signal REF applied to it, which determines the total power to be controlled by control circuit 7-2. The reference signal REF is obtained here from a supply voltage by means of a voltage divider formed of resistors R1, R2. An identical voltage divider is also assigned to the control circuit 7-1. The junctions of both voltage dividers R1, R2 may selectively be connected to ground via a switch 12 and a further resistor R3. In the position of switch 12 shown in the Fig., the resistor R3 is parallel to the resistor R2 of the voltage divider associated to control circuit 7-1, causing a voltage level REF' to be present at the reference signal input of control circuit 7-1, which is lower than REF. When the control circuit 7-1 recognizes a higher total power than the one predetermined for it by REF', it reduces accordingly the power of filling laser 4-1. In consequence, the control circuit 7-2 detects a too low total power and accordingly increases the power of filling laser 4-2. This continues until the power of laser 4-1 is zero. In this state, the circuit board 6-1 can be removed in order to replace it, to carry out maintenance work on it or the like. If it is built in again afterwards, it remains out of operation until the switch 12 is switched over, causing the control circuit 7-1 to receive the reference value REF and to increase the power of filling laser 4-1, while the control circuit 7-2 receives REF' and gradually reduces the power of filling laser 4-2 to zero.

Here, too, it is appropriate to provide different reaction times with which the control circuits 7-1, 7-2 react to changes of the total power detected by their associated photo-detectors 9-1 or 9-2, respectively. Such different reaction times may e.g. be realized using RC-stages or similar delay element 13-1, 13-2 which are insertible into the signal line between photo-detector 9-1, 9-2 and control circuit 7-1, 7-2, respectively, using a switch 14-1, 14-2, respectively. The switches 14-1, 14-2 are coupled to switch 12, so that the control circuit 7-1 or 7-2 which receives the reduced reference signal REF', i.e. control circuit 7-1 in FIG. 3, also receives a delayed photo-detector signal. The control circuit 7-1 can therefore only react slowly to an apparently excessive total power by reducing the power of its filling laser 4-1, whereas a thus caused deviation of the total power from the value actually defined by the level REF is corrected in a much shorter time by control circuit 7-2. The total power therefore never deviates substantially from the value defined by REF.

A further difference between the embodiment of FIG. 3 and the ones discussed previously is that the filling lasers 4-1, 4-2 emit at identical wavelengths and supply their light to one common input 2-1 of multiplexer 1 by a 3 dB coupler 15. The use of the 3 dB coupler 15 causes only half of the output power of the filling lasers to reach the multiplexer 1, so that more powerful filling lasers have to be used than in the embodiments of FIGS. 1 and 2. On the other hand, there is the advantage that an additional wavelength is available on the optical fiber 3 for transmitting information signals. Obviously, also in the embodiments of FIGS. 1 and 2, filling lasers of identical wavelength may be supplied to a common input of multiplexer 1 using a coupler.

Figure 4:
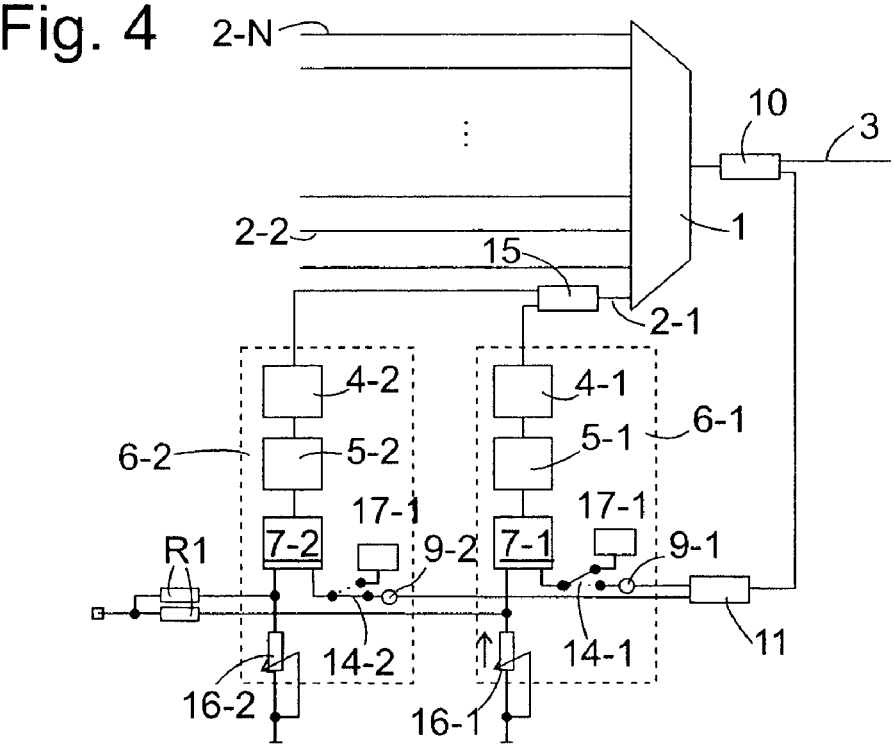

FIG. 4 illustrates a further embodiment of the output stage of the invention. In this embodiment, the reference signal inputs of the control circuits 7-1, 7-2 are connected to the junctions of voltage dividers formed by a fixed resistor R1 connected to the supply voltage and a controller such as a potentiometer 16-1, 16-2 or a transistor connected to ground.

Between the photo-detectors 9-1, 9-2 and the inputs of the control circuits 7-1, 7-2 associated to them, switches 14-1, 14-2 are provided which allow to connect the control circuit selectively to the photo-detector 9-1, 9-2 or to a sample-and-hold member 17-1, 17-2. By connecting to the sample-and-hold member which stores a previous output signal level of the associated photo detector, the concerned control circuit is prevented from reacting to a change in total power detected by its photo detector; its reaction speed is thus practically set to zero.

In order to take the filling laser 4-1 out of operation in the embodiment of FIG. 4, a current output signal level of photo detector 9-1 is taken into the sample-and-hold member 17-1, then the switch 14-1 is brought into the position shown in the Fig., in which it connects the sample-and-hold member 17-1 to control circuit 7-1. At this time, the potentiometer 16-1 is in a position of maximum resistance, in which the potential REF is present as the predetermined value at the input of control circuit 7-1. The potentiometer 16-2 is in the same position, so that the control circuit 7-2, which still receives a detection signal from its photo detector 9-2, can control the total power of the output stage. Now, the resistance of the potentiometer 16-1 is gradually reduced to zero, as indicated by the arrow drawn next to the potentiometer, causing the control circuit 7-1 to gradually reduce the power of filling laser 4-1 to zero. Control circuit 7-2 reacts by increasing the power of filling laser 4-2, so a to keep the total power constant. As soon as the power of filling laser 4-1 is reduced to zero, the circuit board 6-1 on which it is located may be removed.

The invention claimed is:

1. An output stage for wavelength division multiplex (WDM) information transmission, comprising: a plurality of information channel ports each providing a carrier wave modulated with an information signal at an output of the output stage, a first filling light source for providing a filling lightwave to the same output having a power corresponding to a desired power signal supplied to a control input of the first filling light source, at least one photodetector for detecting a total power of all filling lightwaves and carrier waves at the output of the output stage, a first control circuit for generating a first desired power signal such that the total power detected by the photodetector is held constant at a predetermined reference value, the first filling light source being part of a first assembly mounted replaceably at a first mounting location of the output stage, the output stage having a second mounting location at which a second assembly comprising a second filling light source is mounted, and the output stage including an auxiliary circuit for providing one of the two filling light sources with a continuously decreasing second desired power signal, the auxiliary circuit being a second control circuit, each control circuit having a filling light source associated with it and receiving the desired power signal generated by the respective control circuit, each control circuit including means for reducing the reference value individually assigned to them, the control circuits being switchable between two different reaction speeds for controlling the power of the filling light source.

2. The output stage of claim 1, characterized in that the auxiliary circuit receives the desired power signal from the first control circuit and divides it into the second desired power signal and a third desired power signal, wherein the second and third desired power signals are representative for desired powers of the two filling light sources, the sum of which corresponds to the power represented by the first desired power signal.

3. The output stage of claim 2, characterized in that the output is formed by a first output of a power splitter having two outputs, a second of which is connected to the photodetector.

4. The output stage of claim 1, characterized in that the reaction speed with which one of the control circuits reacts to a change of the power detected by the photodetector is set to zero, and the means for reducing the reference value are operative to reduce the reference value gradually to zero.

5. The output stage of claim 1, characterized in that each control circuit is combined with the filling light source controlled by it in one of said replaceable assemblies.

6. The output stage of claim 1, characterized in that each assembly is a circuit board.

7. The output stage of claim 1, and comprising an optical multiplexer having wavelength selective inputs, a first one of which is connected to an output of the first filling light source, and a second one of which is connected to an output of the second filling light source, and the first and second inputs being selective for adjacent frequencies of the wavelength multiplex.

8. The output stage of claim 1, and comprising an optical multiplexer having wavelength selective inputs, one of which is connected to an output of the first filling light source and to an output of the second filling light source by a beam combiner.

9. The output stage of claim 8, characterized in that the beam combiner is a 3 dB coupler.

10. The output stage of claim 1, characterized in that the both mounting locations are equipped with an assembly.

11. A method of replacing filling light sources in an output stage for wavelength division multiplex (WDM) information transmission, comprising the steps of:

mounting an assembly comprising a new filling light source at a mounting location of the output stage;

controlling a power of a filling light source to be removed and of the new filling light source so as to keep constant a total power of carrier and filling lightwaves of the output stage, and at the same time continuously reducing the power of the filling light source to be removed, and continuously increasing the power of the new filling light source, until the power of the filling light source to be removed is zero;

removing the filling light source to be removed; and predetermining a desired value for the total power of carrier and filling lightwaves of the output stage, and independently controlling the power of each filling light source based on a desired value of the total power and a detected effective total power, the power control of the new filling light source being aimed at minimizing a difference between the detected total power and the desired value, whereas the power control of the filling light source to be removed is aimed at minimizing a difference between the detected total power and a fraction of the desired value, the power control of the filling light source to be removed being carried out at a lower reaction speed than for the new filling light source.

12. The method of claim 11, wherein a desired value for the powers of the filling lightwaves is derived from a detected total power of carrier and filling lightwaves of the output stage and is split between the filling light sources.

13. The method claim 11, in which the reaction speed at which the power control of the filling light source to be removed reacts to a change of the total power is set to zero.

* * * * *

UNITED STATES PATENT AND TRADEMARK OFFICE
CERTIFICATE OF CORRECTION

PATENT NO. : 7,822,345 B2  Page 1 of 1
APPLICATION NO. : 10/543730
DATED : October 26, 2010
INVENTOR(S) : Furst It is certified that error appears in the above-identified patent and that said Letters Patent is hereby corrected as shown below:

In Fig. 3, Sheet 2 of 2, delete "  " and insert --  --, therefor.

In Column 1, Line 8, delete "(WDM," and insert -- (WDM), --, therefor.

In Column 4, Line 11, delete "(not shown" and insert -- (not shown) --, therefor.

In Column 6, Line 65, delete "so a to keep" and insert -- so as to keep --, therefor.

In Column 8, Line 48, in Claim 13, after "method" insert -- of --.

Signed and Sealed this
Twenty-seventh Day of September, 2011

David J. Kappos
*Director of the United States Patent and Trademark Office*